Figure 1:
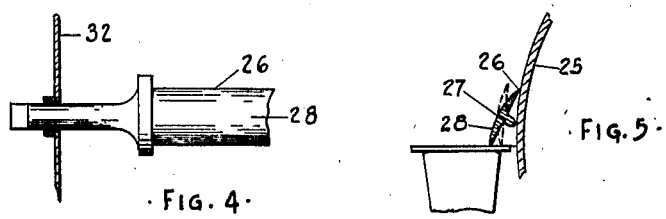
Figure 1:
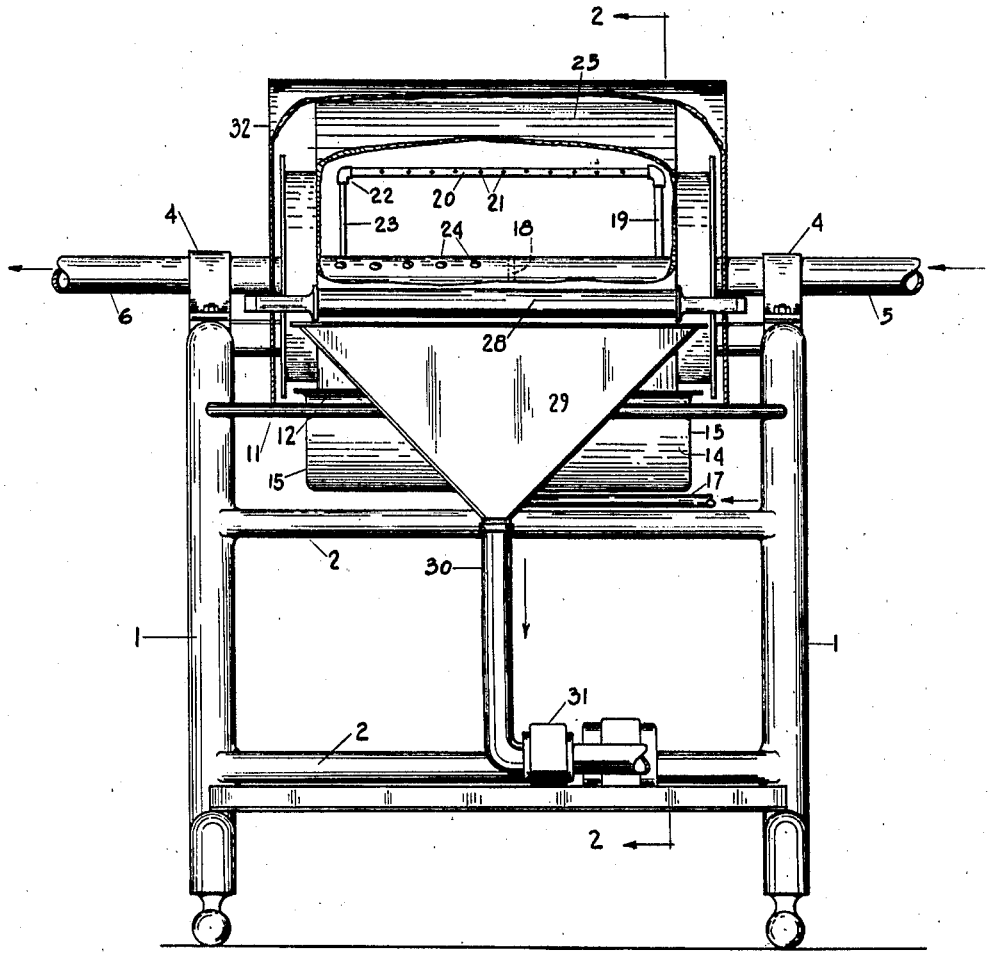

Aug. 17, 1943.   R. J. SPEIRS   2,327,140
PROCESS OF CHILLING AND PACKING CREAM
Filed April 20, 1940   2 Sheets-Sheet 1

INVENTOR.
RICHARD J. SPEIRS
BY
J. Stuart Freeman.
ATTORNEY.

Aug. 17, 1943.  R. J. SPEIRS  2,327,140
PROCESS OF CHILLING AND PACKING CREAM
Filed April 20, 1940  2 Sheets-Sheet 2
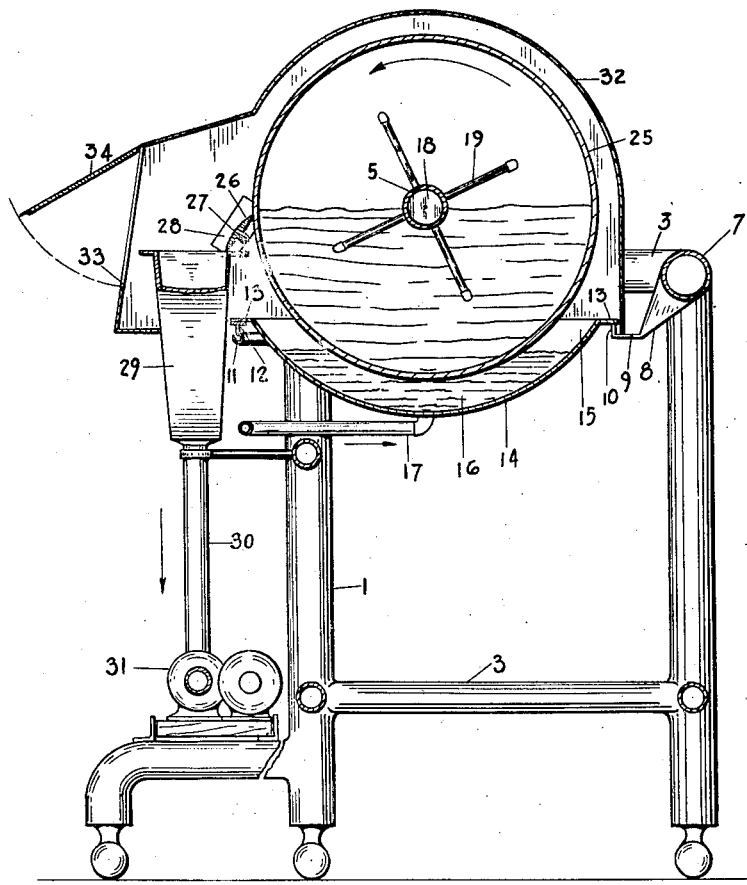
INVENTOR.
RICHARD J. SPEIRS
BY J. Stuart Freeman.
ATTORNEY.

Patented Aug. 17, 1943

2,327,140

UNITED STATES PATENT OFFICE 2,327,140

PROCESS OF CHILLING AND PACKING CREAM

Richard J. Speirs, Cameron, Wis., assignor to Abbotts Dairies, Inc., Philadelphia, Pa., a corporation of Maryland Application April 20, 1940, Serial No. 330,688

4 Claims. (Cl. 62—173)

The object of the invention is to provide an improved process of chilling and packing cream, and more specifically to cream having a butter fat content of 70% or higher.

To a large degree the production of cream is a seasonal function, which at its peak frequently does not coincide with the peak demand for cream in the production of ice cream, butter, certain cheeses and possibly other dairy products, wherefore there has long been a demand for an economical process to so preserve cream during the so-called glut periods, viz., periods during which more milk is produced than is consumed, either as milk or in the production of cream as its principal constituent, and/or during which the cost of the cream is sub-normal, in order that the cream thus preserved can be stored for several months, at least, without deteriorating in any way, and which can be at any subsequent time thinned to the desired degree, by mixing the necessary proportion of water, skim-milk, or whole milk thereto. Furthermore, the shipment of the normal fluid phase of milk is a costly and highly uneconomic proposition, wherefore the ultimate aim has been to concentrate the cream as far as possible down to the solid and butter fat base, but heretofore the feasible limit of such concentration has been only to that degree represented by an approximately 65% butter fat content. To exceed this point various methods have been tried, such as substantially solid freezing, first heating and then freezing, evaporating to dryness, et cetera, but with all such previous methods the resulting product, when again thawed and mixed with water, skim-milk or whole milk, is found to have acquired an undesirable taste, unnatural physical characteristics and occasionally an unpleasant odor.

Another object, therefore, is to provide a process and incidental apparatus, which will produce a product that is fully acceptable from the standpoint of public health, that prevents even the slightest change of phase from cream to butter, and that eliminates all danger of entrapping air, as a carrier of bacteria, within its bulk. In order to accomplish this end, the present process comprises the packing of the chilled cream while partially in a liquid state, while the remainder is in a relatively solid or congealed state, the average condition of the product being what might be termed semi-plastic.

With the objects thus briefly stated, the invention comprises additional details, which are hereinafter fully brought out in the following description, when read in conjunction with the accompanying drawings, in which Fig. 1 is a front elevation of one type of machine by means of which the improved process hereinafter disclosed may be carried out in practise, a portion of the cover and the enclosed chilling cylinder of said machine being broken away in order to expose the interiors of the same; Fig. 2 is a vertical section on the line 2—2 of Fig. 1; Fig. 3 is a diagrammatic view representing a section of a fragmentary portion of the chilling cylinder, covered upon its exterior surface with a film of concentrated cream and showing the inner portion of such film as being substantially solid, while the outer portion remains in a sluggish or semi-liquid condition; Fig. 4 is an enlarged fragmentary left end elevational view of the scraper; and Fig. 5 is a fragmentary sectional view of a portion of the drum and scraper in association with the adjacent upper portion of the hopper.

Referring to the drawings, any suitable base is shown as comprising spaced upright base members or legs 1, connected by horizontally extended bars 2, the end pairs of said legs being connected by horizontally extending bars 3, which support brackets 4 through which extend inlet and outlet pipes 5 and 6. The rearmost legs are connected at their upper portions by means of a transversely extending member 7, from which depends downwardly and forwardly a bracket 8, providing an upwardly directed channel 9, which terminates forwardly in a flange 10. The forward pair of said legs are connected together by means of a bar 11, to which is secured an upwardly extending bracket 12. Upon the rear bracket flange 10 and the forward bracket 12 rest the outwardly directed flanges 13 of a suitably shaped trough or open-top vessel 14, which in cross section is preferably arcuate, while its opposite ends are closed by vertical walls 15. Into this trough, cream 16 is pumped under pressure by way of an inlet pipe 17, after it has first been concentrated to the desired degree of density represented by a 70% butter fat content or even higher. The thickness of the film of cream adhering to the drum varies between approximately 1/8" to 3/16", depending upon the temperature at which the cream is introduced, as compared with the temperature of the refrigerant and the speed of rotation of the drum. As the temperature of the cream introduced into the trough affects the viscosity of the cream, the higher the temperature, the thinner will be the film upon the drum. This thickness of the film may, therefore, be controlled to a certain degree through varying the temperature of the refrigerant, especially if a refrigerant is used having a freezing point below 32° F., and also through regulating the speed of the rotation of the drum, depending upon the temperature at which the raw concentrated cream is introduced into said trough.

The cream entering said trough is understood to have been previously treated in a centrifugal or equivalent separator, by which it has been dissociated from the whey phase of the initial whole milk. The lower limit of 70% butterfat content is specified, not so much as that of itself is essential, but due to the fact that this is the minimum concentration of cream that will adhere to the polished surface of the drum, at the average temperature at which that element is rotated and in sufficient quantity to make this style of cooling practicable. A further factor of controlling importance is the fact that the temperature of the cream within said trough, and therefore as it comes into contact with said drum, is approximately 100° F. or higher, in some localities a temperature of as high as 130° F. being required, while probably the most economical temperature of the refrigerant is 33° F., which permits water alone to be used to obtain a final temperature of approximately 55° F., when cream at 100° F. is received in the trough. When cream is received at a higher temperature up to about 130° F., the temperature of the chilled product is nearer 65° F., using water at 33° F., and if necessary slowing the speed of rotation of the drum somewhat. On the other hand, if cream received at the usual 100° F. is to be lowered to 50° F., or thereabouts, a non-freezing liquid refrigerant must be used at a temperature lower than 32° F.

Returning to the drawings, the inlet and outlet pipes 5 and 6 may be separate and terminate in spaced relation with each other, or may preferably comprise a single pipe sub-divided at an intermediate point by a transversely extending partition 18. Assuming the latter construction, as shown in Fig. 1, the inlet end of said pipe is provided with a series of radially extending tubes 19, each of which is provided with a horizontally extending section 20 having spaced discharge orifices 21 and closed at its opposite free end 22, the free ends of said sections 20 being preferably supported in fixed spaced relation with respect to the outlet end 6 of the first-mentioned pipe by means of a series of radial rods 23 or the like to prevent sagging and vibration. The outlet pipe upon the opposite side of said partition 18 is provided with relatively large exit openings 24, the aggregate areas of said openings being sufficient to carry off the entire volume of refrigerant medium as discharged from the greater number of smaller orifices 21 in the several inlet pipes 19—20. Rotatably mounted upon the pipe (or pipes) 5—6, and surrounding the said inlet pipes 19—20 and the outlet exits 24, is a hollow cylindrical drum 25 closed at its opposite ends and comprising a perfectly smooth polished cylindrical outer surface which extends downwardly beneath the level of the cream 16 in the container 14, as said cylinder is rotated by any suitable means, the speed of rotation of said cylinder being approximately from five to eight revolutions per minute in the size and construction of the device represented by the accompanying drawings, the speed of said drum being either fixed or variable, but preferably the latter. The arrangement of the nozzles substantially as shown operates both to insure uniform distribution of the refrigerant spray and resulting temperature, while also maintaining turbulence of the body of refrigerant in the lower portion of the drum.

Extending across the frontal portion of and bearing lightly and uniformly against the polished surface of the cylinder 25 is one edge 26 of a scraper bar 27, which edge operates to remove the chilled and partially congealed film of cream from said cylinder, after which the cream thus removed gravitates across the outer, preferably convex surface 28 of said scraper bar, and is discharged by the lower edge thereof into a hopper 29. Said scraper may be formed of a metal that is inert to milk, or of other substances such as the inert resins represented by Bakelite, Plexiglass, and the like. The hopper 29 may be of any desired shape, but is shown in the drawings as tapering downwardly towards a discharge tube 30, whence the cream within said hopper is led into whatever shape, form or capacity of storage and shipping containers may be desired. However, while it is to be understood that the chilled cream may be packaged in storage and shipping containers directly as it leaves the said hopper, it is preferable in practise to employ a pump 31 driven by a variable speed motor, to force the product to the final containers at a point several feet distant.

The entire working parts of such a device as that herein described may be effectively shielded from dirt and foreign matter in general by means of a suitable cover. Such a cover is illustrated as comprising a rear with substantially cylindrical portion 32, which conforms substantially to the curvature of the cylinder 25, while the forward portion of said cover is provided with an opening 33, which is preferably spanned by a suitable transparent medium 34, such as glass, or one of the several available plastic materials of similar nature. The rear wall of said cover is shown as resting in the upwardly directed channel 9 of the bracket 8, while the laterally opposite sides of said cover may be supported either by the pipes 5 and 6, or by the transversely extending bar 11, or in fact otherwise, if desired. As to all of those parts of the apparatus which contact the cream, these should be made of or plated with a metal that is inert with respect to cream and milk, or of one of the several inert resins herein referred to, or other equivalent materials.

After the cream has been chilled and packed in containers as hereinbefore related, it is immediately transferred to a refrigerating room where it is further cooled (usually to below zero), where it can be maintained as long as desired. Heretofore, liquid cream like milk has been placed in containers directly and there chilled and frozen into the solid state, or such a low temperature of refrigerant has been used that there has been formed solid flakes or ribbons, with no liquid or semi-liquid phase to exclude the air. This has invariably resulted in at least four detrimental conditions:

1. The dry product, leaving the drum in a solid condition, fails to pack properly or economically in the final container, thereby necessitating a further operation of re-packing, tamping or compressing the cream within such container, as may be found most desirable. Thus, no known prior method produces a finished package of cream that will meet the sanitary and public health regulations now widely adopted by both governmental and local agencies.

2. The act of actually freezing cream solid upon the surface of the drum, in addition to the friction, pressure and concussion, required to pack the product in the final package, has heretofore been conducive to a partial churning of the product, which invariably changes a large proportion of the product from the cream phase into the butter phase.

3. It has long been accepted by dairy scientists that air dispersed in cream results in a breakdown in flavor and other desirable characteristics. Placing frozen flakes of cream in a container and then packing them down, as by tamping or similarly, fails to eliminate such air and proportionately increases the hazard arising from the inclusion of such air.

4. Ordinary cream placed in a container and frozen is no longer a commercially economical product due to the relatively high proportion of water that it contains, while cream of 70% butter fat content and higher cannot be placed in a container without first raising it in temperature to approximately 80° F. to 90° F., as at low temperatures of 33° F. and thereabouts such cream is substantially solid and will not pour.

By contrast, the present process comprises the chilling of cream to the degree represented by a 70% or higher butter fat, as hereinbefore described, so as to permit the packaging of such heavy chilled cream while still in a semi-liquid state, without any of the resulting disadvantages or drawbacks herein mentioned. The principle by which this is accomplished is based upon the rate of heat transfer from the cream upon the surface of the drum to the refrigerant with which said drum is chilled, and which in turn is related to the rate of heat conductivity of butter fat, plus the time element within which it is possible to handle the product in a semi-liquid state, so that under ordinary conditions within only a few minutes after reaching the container it becomes substantially solid, even though no additional cooling is applied to it. These principles are made use of by congealing that part of the cream film adjacent to and in contact with the surface of the drum to a point where it is solid to all intents and purposes, while at the same time, because of the low rate of heat conductivity of the cream film, that portion of the cream farther from the surface is chilled to a less degree, and is accordingly removed from the drum in a relatively liquid state. That portion of the cream remaining in a liquid condition is sufficient in volume to serve as a vehicle with which to transport the more solid portion of the cream to the container, and also serves to fill all interstices in and around the relatively solid portions or particles, thereby effecting the complete exclusion of air from within the final mass or bulk within a given storage and shipping container. The actual mixing of the said outer and inner portions of the film is effected through the agitation and turbulence created primarily by the pump, while the cream is in transit through the sanitary tubing from the scraper 27 to the final package.

Such a form of cream, as that produced by the process hereinbefore described, may then be used at any subsequent time, in whole or in part, by thawing to a temperature at least slightly above freezing, whereupon the proper porportion of water or milk is added to produce a cream product of the desired consistency for use as such, or for the production of ice cream or other secondary products.

Having thus described my invention, what I claim as new and desire to protect by Letters Patent of the United States is:

1. The process of handling cream, which consists in providing in a vessel a body of heated cream having a butter fat content of 70% or higher, withdrawing a film of such cream upon a cooling surface from said body and delivering the same on said surface to a removal zone and cooling the cream in its travel to said zone, separating the product in said zone from said surface and delivering the same to a receptacle, the rate of travel of the cream from the surface of said body to the removal zone and the degree of cooling being so correlated that the cream forms a solidified layer of gradually increasing thickness underlying a relatively liquid layer of diminishing thickness, and reaches the receptacle in such condition that the more liquid portion enters into the spaces between the more solid portions of the cream and expels air therefrom.

2. The process of handling cream, which consists in extending cream concentrated to a 70% or higher butter fat content upon a moving chilled surface, coordinating the temperature of the chilled surface with the speed of movement of said surface and the film carried thereby from the point of its formation to the point of its removal from said surface, to produce a film of cream that is partly congealed to solidification and partly fluid, removing the film of cream from such surface into a receptacle, in such condition that the fluid phase fills and expels air from the interstices within the solid phase, and the resultant body substantially solidifies as a homogeneous mass.

3. The process of handling cream for storage and shipment, which consists in providing in a vessel a body of cream concentrated to a 70% or higher butter fat content, withdrawing a film of cream upon a moving chilled surface which extends upwardly from beneath the surface of the cream in such vessel, coordinating the temperature of the chilled surface with the speed of movement of said surface and the film carried thereby from the point of its formation to the point of its removal from said surface, to cause that portion of such film adjacent to the chilled surface to be relatively solidified, while that portion of the cream in such film farthest removed from said chilled surface remains relatively fluid, removing the film from such surface into a receptacle, in such condition that the fluid phase fills and expels the air from the interstices within the solid phase and thereupon produces a substantially solid product.

4. The process of handling cream for storage and shipment, which consists in providing in a vessel a body of cream concentrated to a 70% or higher butter fat content, withdrawing a film of cream upon a moving chilled surface which extends upwardly from beneath the surface of the cream in such vessel, coordinating the temperature of the chilled surface with the speed of movement of said surface and the film carried thereby from the point of its formation to the point of its removal from said surface, to cause that portion of such film adjacent to the chilled surface to be relatively solidified, while that portion of the cream in such film farthest removed from said chilled surface remains relatively fluid, removing the film from such surface into a receptacle, in such condition that the fluid phase fills and expels the air from the interstices within the solid phase and thereupon produces a substantially solid product, capable of being subsequently diluted when and to the degree desired for use as cream or in products derivable therefrom.

RICHARD J. SPEIRS.